UNITED STATES PATENT OFFICE.

JEAN JULES MARIE ANTOINE EUGÈNE SCHNEIDER, OF PARIS, FRANCE.

CONSTRUCTION OF HINGES FOR CONNECTING THE WARPING PLANES TO THE WINGS OR FIXED PLANES IN AIRCRAFT.

1,342,353.

Specification of Letters Patent.

Patented June 1, 1920.

Application filed July 2, 1919. Serial No. 308,266.

*To all whom it may concern:*

Be it known that I, JEAN JULES MARIE ANTOINE EUGÈNE SCHNEIDER, a resident of Paris, in the Republic of France, have invented an Improved Construction of Hinges for Connecting the Warping Planes to the Wings or Fixed Planes in Aircraft, which invention is fully set forth in the following specification.

Hitherto the warping planes of aeroplanes or aircrafts have been hinged to the wings or fixed planes of those flying machines either by means of continuous hinges or by means of a plurality of single hinges.

In aircrafts of large size the pins of such hinges are subjected to considerable strain owing to the height or depth of curvature of the wings at their center relatively to their ends. The result of this is to rapidly deform the hinges which are thereby prevented from working in the proper manner.

The present invention has for its object to provide an improved construction of hinge for connecting the warping planes to the wings, which is particularly adapted for use in aircrafts of large size, and which is completely free from the drawback above stated.

For this purpose the improved hinge is constituted essentially by a plurality of cardan couplings suitably distributed along the length of the warping planes; the pivot pins of these cardan couplings are constituted respectively by a pivot pin movable in a bearing carried by the wing, and by a pivot pin movable in bearings carried by the warping plane.

A constructional form of this invention is illustrated by way of example in the accompanying drawings in which.

Figure 1:
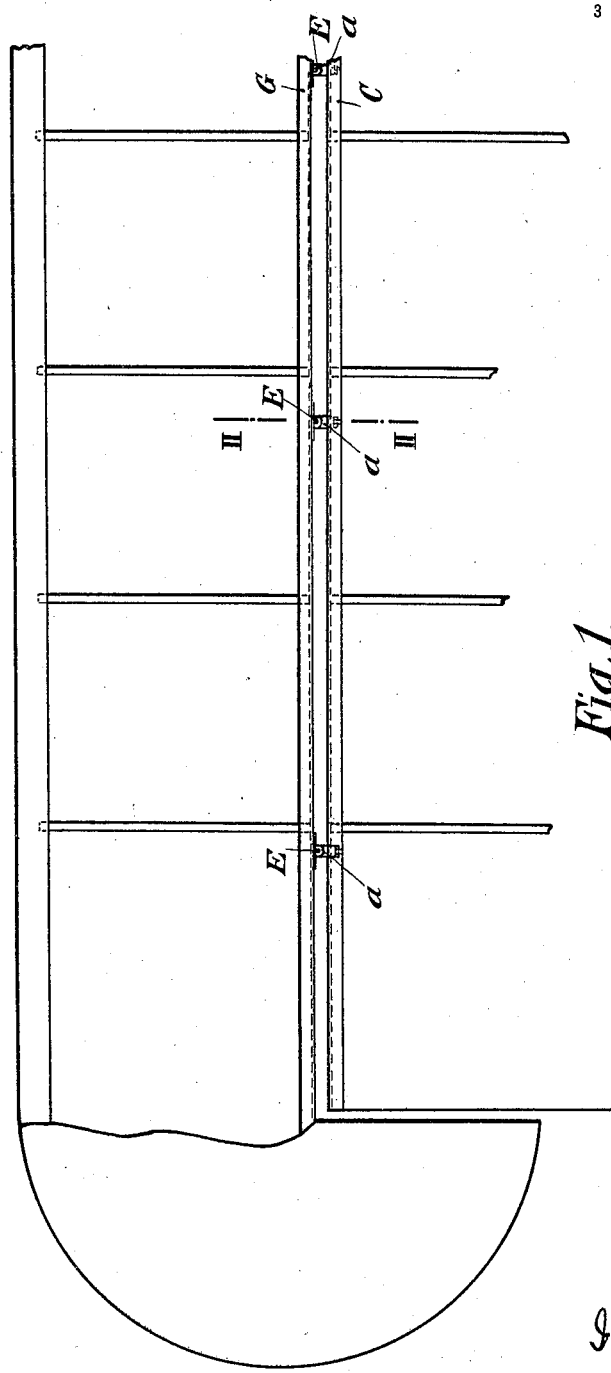
Figure 1 is a partial diagrammatic plan of an aeroplane wing and of the warping plane hinged to the latter; this plan shows the location of the several separate hinges.
Figure 2:
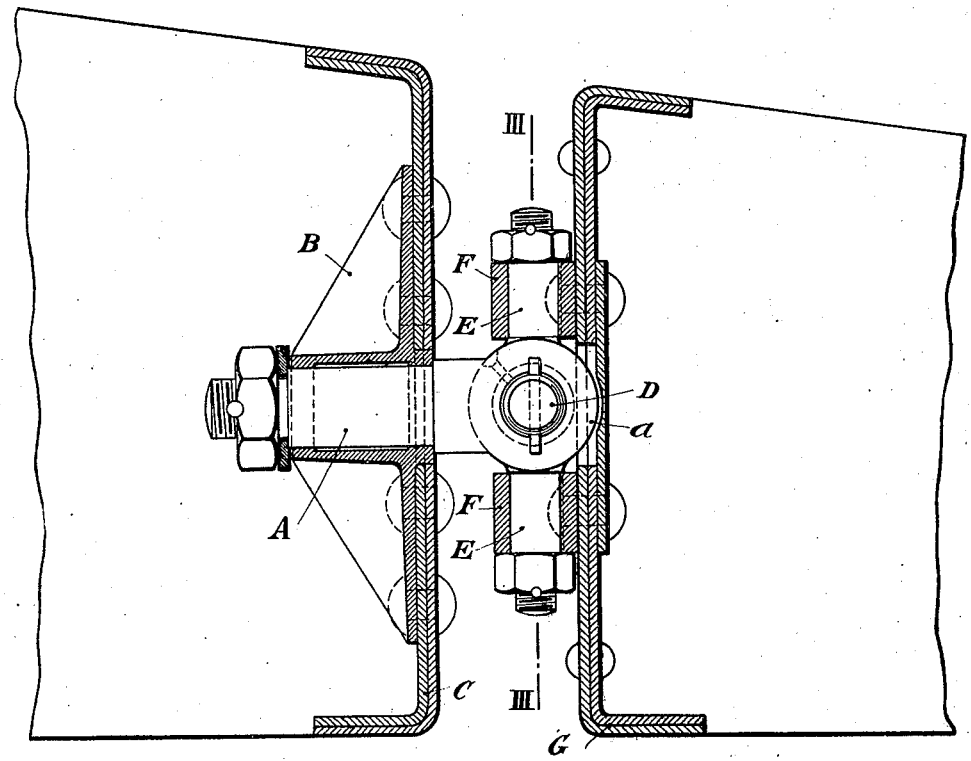
Fig. 2 is a vertical section on the line II—II of Fig. 1 showing the details of one hinge.
Figure 3:
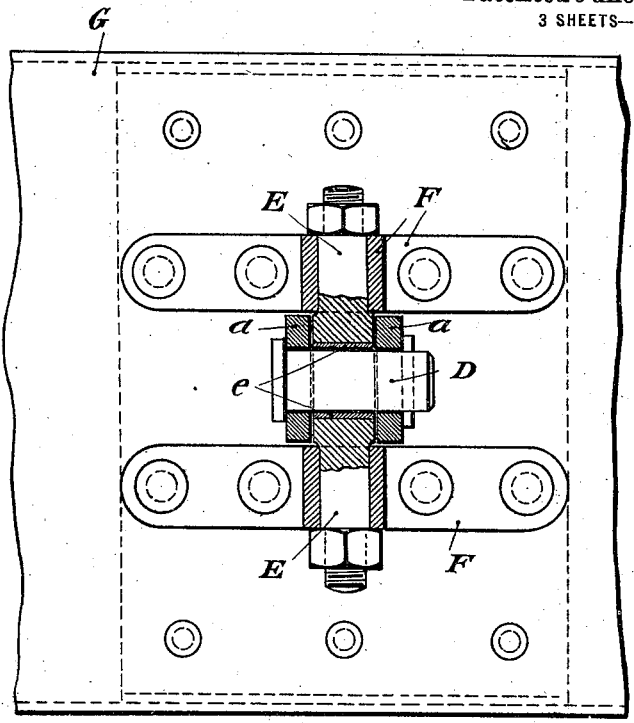
Fig. 3 is a vertical section on the line III—III of Fig. 2.
Figure 4:
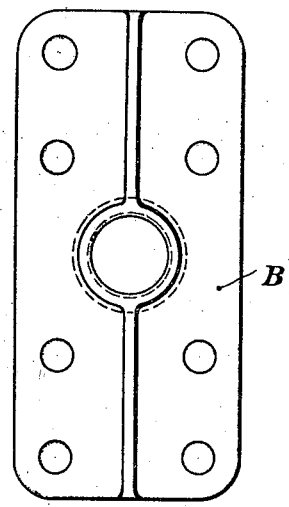
Fig. 4 is a front view of the bearing supporting the pivot pin of the cardan coupling carried by the wing.

Each hinge is constituted by a cardan coupling, the horizontal pivot pin A of which is constituted by a pivot pin movable in a bearing B fixed to the rear longitudinal C of the wing. The pivot pin A ends in a block or fork the limbs a—a of which carry a horizontal pivot pin or pintle D at right angles to the pivot pin A, and upon which a pivot pin E is engaged by means of an eye e formed at its center. This pivot pin is normally vertical and it is movable at its ends in bearings F fixed to the longitudinal G of the warping plane.

It will be perceived that the warping plane can be inclined relatively to the wing by rotating the pivot pins E around the hinge pins D. The mobility in the longitudinal direction of the warping plane relatively to the wing is rendered possible by the rotation of the pivot pins A in the bearings B. On the other hand the mobility of the pivot pins E in the bearings F facilitates the carrying along of the warping plane by the wing in the bending movements of the latter. The elementary movement of different amplitudes of the various sections of the wings can take place without undue fatigue of the hinge pins D.

What I claim is:

1. An improved construction of hinges for connecting the warping planes to the wings or fixed planes of an aircraft, said improved construction consisting of a plurality of forks or blocks each projecting on a horizontal pivot pin that is movable in a bearing formed on the wing, each fork supporting a horizontal hinge pin at right angles to the said pivot pin, upon which there is engaged by means of an eye formed at its center, a pivot pin which is normally vertical and movable at its ends in bearings carried by the warping plane, whereby the warping plane is hinged to the wing or fixed plane by a series of cardan couplings whose pivot pins are capable of pivoting respectively in the wing or fixed plane and in the warping plane.

2. An improved construction of hinges for connecting the warping planes to the wings or fixed planes of an aircraft, each hinge comprising a horizontal pin mounted in one of the wing-members, and a vertical pin mounted on the other wing-member and hinged to the horizontal pin to permit either horizontal or vertical pivoting between the two wing-members.

3. An improved construction of hinges for connecting the warping planes to the wings or fixed planes of an aircraft, each hinge comprising a horizontal pin journaled to one wing-member, a vertical pin journaled to the other wing-member, and a pintle journaled in both of said pins to connect the same to permit either horizontal or vertical pivoting between the two wing-members.

In testimony whereof I have signed this specification.

JEAN JULES MARIE ANTOINE
EUGÈNE SCHNEIDER.

Witnesses:
 ANDRÉ MOSTICKER,
 CHAS. P. PRESSLY.